United States Patent
Nakajima et al.

(10) Patent No.: US 11,807,744 B2
(45) Date of Patent: Nov. 7, 2023

(54) POLYPROPYLENE COMPOSITION AND MOLDED ARTICLE

(71) Applicant: BASELL POLIOLEFINE ITALIA S.R.L., Milan (IT)

(72) Inventors: Takeshi Nakajima, Kanagawa (JP); Kunio Yamamoto, Kanagawa (JP); Masashi Uchida, Kanagawa (JP)

(73) Assignee: Basell Poliolefine Italia S.r.l., Milan (IT)

( * ) Notice: Subject to any disclaimer, the term of this patent is extended or adjusted under 35 U.S.C. 154(b) by 314 days.

(21) Appl. No.: 17/285,838

(22) PCT Filed: Oct. 17, 2019

(86) PCT No.: PCT/JP2019/041813
§ 371 (c)(1),
(2) Date: Apr. 15, 2021

(87) PCT Pub. No.: WO2020/080555
PCT Pub. Date: Apr. 23, 2020

(65) Prior Publication Data
US 2021/0388192 A1    Dec. 16, 2021

(30) Foreign Application Priority Data

Oct. 18, 2018 (JP) ................................. 2018-196745

(51) Int. Cl.
*C08L 23/16* (2006.01)
*C08L 23/12* (2006.01)

(52) U.S. Cl.
CPC .............. *C08L 23/12* (2013.01); *C08L 23/16* (2013.01); *C08L 2201/00* (2013.01); *C08L 2205/025* (2013.01); *C08L 2207/02* (2013.01)

(58) Field of Classification Search
None
See application file for complete search history.

(56) References Cited

FOREIGN PATENT DOCUMENTS

| | | | |
|---|---|---|---|
| EP | 728769 | A1 | 8/1996 |
| JP | 2002520426 | A | 7/2002 |
| JP | 2004131537 | A | 4/2004 |
| JP | 2005306910 | A | 11/2005 |
| JP | 4959920 | B2 | 6/2012 |
| JP | 201328705 | A | 2/2013 |
| JP | 2014091781 | A  * | 5/2014 |
| JP | 2014091781 | A | 5/2014 |
| JP | 2014201602 | A | 10/2014 |
| JP | 2016089012 | A | 5/2016 |
| JP | 2018080231 | A | 5/2018 |
| WO | 2009050045 | A2 | 4/2009 |
| WO | 2009057747 | A1 | 5/2009 |
| WO | 2010078494 | A2 | 7/2010 |
| WO | 2011134897 | A2 | 11/2011 |
| WO | 2017178191 | A1 | 10/2017 |

* cited by examiner

*Primary Examiner* — Richard A Huhn

(57) ABSTRACT

A polypropylene composition made from or containing:
  (i) component (1) made from or containing a propylene homopolymer or copolymer containing 0 to 0.5% by weight of an ethylene-derived unit; and
  (ii) component (2) made from or containing an ethylene/propylene copolymer containing 65 to 85% by weight of an ethylene-derived unit;
wherein
1) the Mw/Mn value of xylene insolubles (XI) of the polypropylene composition as measured by GPC is in the range of 6 to 20,
2) the weight ratio of component (1) to component (2) is in the range of 70:30 to 85:15,
3) the intrinsic viscosity of xylene solubles (XSIV) of the polypropylene composition is in the range of 1.0 to 3.0 dl/g, and
4) the MFR (at 230° C. under a load of 2.16 kg) of the polypropylene composition is in the range of 3 to 15 g/10 min.

6 Claims, No Drawings

POLYPROPYLENE COMPOSITION AND MOLDED ARTICLE

This application is the U.S. National Phase of PCT International Application PCT/JP2019/041813, filed Oct. 17, 2019, claiming benefit of priority to Japan Patent Application No. 2018-196745, filed Oct. 18, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to polypropylene compositions and molded articles thereof.

ART OF THE INVENTION

For housings of home electric appliances, focus applies to mechanical characteristics such as stiffness and low temperature impact resistance as well as appearance such as gloss. In some instances, housings of home electric appliances have been produced using ABS resin or alternatively, polypropylene compositions.

SUMMARY OF THE INVENTION

[1] In a general embodiment, the present disclosure provides a polypropylene composition made from or containing:
(i) component (1) made from or containing a propylene homopolymer or copolymer containing 0 to 0.5% by weight of an ethylene-derived unit, based upon the total weight of the propylene homopolymer or copolymer; and
(ii) component (2) made from or containing an ethylene/propylene copolymer containing 65 to 85% by weight of an ethylene-derived unit, based upon the total weight of the ethylene/propylene copolymer;
wherein
1) the Mw/Mn value of xylene insolubles (XI) of the polypropylene composition as measured by GPC is in the range of 6 to 20,
2) the weight ratio of component (1) to component (2) is in the range of 70:30 to 85:15,
3) the intrinsic viscosity of xylene solubles (XSIV) of the polypropylene composition is in the range of 1.0 to 3.0 dl/g, and
4) the MFR (at 230° C. under a load of 2.16 kg) of the polypropylene composition is in the range of 3 to 15 g/10 min.

[2] In some embodiments, components (1) and (2) are polymers obtained by polymerizing propylene and ethylene using a catalyst made from or containing: (a) a solid catalyst made from or containing magnesium, titanium, a halogen, and an electron donor compound selected from succinate-based compounds, (b) an organoaluminum compound, and optionally (c) an external electron donor compound.

[3] In some embodiments, the polypropylene composition is further made from or containing 0.01 to 1.0 parts by weight of a crystal nucleating agent based on a total of 100 parts by weight of component (1) and component (2);

[4] In some embodiments, the crystal nucleating agent is selected from the group consisting of phosphoric ester-based nucleating agents, triaminobenzene derivative-based nucleating agents, and combinations thereof.

[5] In some embodiments, the polypropylene composition is further made from or containing not more than 2 parts by weight of a plate-like inorganic filler based on a total of 100 parts by weight of component (1) and component (2).

[6] In some embodiments, the present disclosure provides an injection-molded article made from or containing the polypropylene composition.

DETAILED DESCRIPTION OF THE INVENTION

As used herein, a numerical range defined as "X to Y" include both endpoints X and Y.

1. Polypropylene Composition

In some embodiments, the present disclosure provides a polypropylene composition made from or containing components (1) and (2):
(i) component (1) made from or containing a propylene homopolymer or copolymer containing 0 to 0.5% by weight of an ethylene-derived unit, based upon the total weight of the propylene homopolymer or copolymer; and
(ii) component (2) made from or containing an ethylene/propylene copolymer containing 65 to 85% by weight of an ethylene-derived unit, based upon the total weight of the ethylene/propylene copolymer.

(1) Component (1)

In some embodiments, component (1) is a propylene homopolymer or copolymer containing 0 to 0.5% by weight of an ethylene-derived unit, based upon the total weight of the propylene homopolymer or copolymer. A propylene polymer containing 0% by weight of an ethylene-derived unit refers to homo-polypropylene. A propylene/ethylene copolymer containing 0.5% by weight of an ethylene-derived unit refers to a copolymer composed of an ethylene-derived unit and a propylene-derived unit at a weight ratio of 0.5:99.5. In some embodiments, the upper limit of the ethylene-derived unit content in component (1) is not more than 0.4% by weight. It is believed that when this content exceeds the upper limit, a decrease in stiffness occurs. In some embodiments, the component (1) contains an ethylene-derived unit and the lower limit of the content of the ethylene-derived unit in component (1) is more than 0% by weight, alternatively not less than 0.1% by weight. In some embodiments, the component (1) contains an ethylene-derived unit and is a random copolymer.

(2) Component (2)

In some embodiments, component (2) is an ethylene/propylene copolymer containing 65 to 85% by weight of an ethylene-derived unit, based upon the total weight of the ethylene/propylene copolymer. In some embodiments, the upper limit of the ethylene-derived unit content in component (2) is not more than 85% by weight, alternatively not more than 80% by weight. It is believed that when this content exceeds the upper limit, a decrease in low temperature impact resistance occurs. In some embodiments, the lower limit of the ethylene-derived unit content in component (2) is not less than 65% by weight, alternatively not less than 70% by weight. It is believed that when this content falls below the lower limit, a decrease in gloss occurs.

(3) Composition Ratio of Component (1) to Component (2)

In some embodiments, the composition ratio (weight ratio) of component (1) to component (2) is in the range of 70:30 to 85:15, alternatively in the range of 75:25 to 83:17. It is believed that when the content of component (1) exceeds the upper limit, a decrease in low temperature impact resistance occurs. It is believed that when the content of component (1) falls below the lower limit, a decrease in stiffness occurs.

(4) Crystal Nucleating Agent

In some embodiments, the polypropylene composition is further made from or containing a crystal nucleating agent. As used herein, the term "crystal nucleating agent" refers to an additive used to improve stiffness by controlling the amount and orientation of a crystalline component in a resin. It is believed that because the crystal nucleating agent promotes the solidification of a molten resin during cooling, this agent may impart stiffness or reduce cycle time in injection molding. In some embodiments, the crystal nucleating agent is selected from organic nucleating agents such as phosphoric ester-based nucleating agents, nonitol-based nucleating agents, sorbitol-based nucleating agents, triaminobenzene derivative-based nucleating agents, metal carboxylate-based nucleating agents, xylitol-based nucleating agents, and rosin-based nucleating agents. In some embodiments, the crystal nucleating agent is selected from the group consisting of phosphoric ester-based nucleating agents and triaminobenzene derivative-based nucleating agents. It is believed this group of nucleating agents promote high stiffness and less production of odor-causing volatile components. In some embodiments, the phosphoric ester-based nucleating agents are aromatic phosphoric ester-based nucleating agents. In some embodiments, the aromatic phosphoric ester-based nucleating agents are selected from the group consisting of phosphoric acid-2,2'-methylenebis(4,6-di-t-butylphenyl)sodium salt, phosphoric acid-2,2'-methylenebis(4,6-di-tert-butylphenyl)aluminum salt, and phosphoric acid-2,2'-methylenebis(4,6-di-tert-butylphenyl) lithium salt. In some embodiments, the nonitol-based nucleating agent is 1,2,3-trideoxy-4,6:5,7-bis-[(4-propylphenyl)methylene]-nonitol. In some embodiments, the sorbitol-based nucleating agent is 1,3:2,4-bis-o-(3,4-dimethylbenzylidene)-D-sorbitol. In some embodiments, the triaminobenzene derivative-based nucleating agent is 1,3,5-tris(2,2-dimethylpropanamide)benzene. In some embodiments, the metal carboxylate-based nucleating agents are selected from the group consisting of sodium adipate, potassium adipate, aluminum adipate, sodium sebacate, potassium sebacate, aluminum sebacate, sodium benzoate, aluminum benzoate, aluminum di-para-t-butylbenzoate, titanium di-para-t-butylbenzoate, chromium di-para-t-butylbenzoate, and aluminum hydroxy-di-t-butylbenzoate. In some embodiments, the xylitol-based nucleating agents are selected from the group consisting of bis-1,3:2,4-(5',6',7',8'-tetrahydro-2-naphthaldehydebenzylidene)-1-allyl-xylitol and bis-1,3:2,4-(3',4'-dimethylbenzylidene)-1-propyl-xylitol. In some embodiments, the rosin-based nucleating agents are selected from the group consisting of rosinic acid metal salt compounds and rosinic acid partial metal salt compounds, which are obtained by reaction of a rosinic acid with a metal. In some embodiments, the rosinic acid is selected from the group consisting of pimaric acid, sandaracopimaric acid, palustric acid, isopimaric acid, abietic acid, dehydroabietic acid, neoabietic acid, dihydropimaric acid, dihydroabietic acid and tetrahydroabietic acid. In some embodiments, the metal is selected from the group consisting of calcium and magnesium. In some embodiments, the rosin-based nucleating agent is a partial calcium salt of a rosinic acid. In some embodiments, the crystal nucleating agents is used alone, or in a combination of two or more crystal nucleating agents.

In some embodiments, the crystal nucleating agent is added through the use of a masterbatch made from or containing a crystal nucleating agent and an olefinic polymer. In some embodiments, the matrix polymer in the masterbatch is made from or containing component (1) or component (2). In some embodiments, the amount of the masterbatch and the concentration of the crystal nucleating agent in the masterbatch are adjusted to provide a weight ratio of component (1) to component (2) in the polypropylene composition within the following range. In some embodiments, the matrix polymer is not made from or containing component (1) or component (2) while the polypropylene composition is made from or containing the matrix polymer as any other component described below.

In some embodiments, the content of the crystal nucleating agent is in the range of 0.01 to 1.0 parts by weight, alternatively in the range of 0.01 to 0.5 parts by weight, alternatively in the range of 0.015 to 0.45 parts by weight, based on a total of 100 parts by weight of components (1) and (2) (hereinafter also referred to as "resin components"). It is believed that when no crystal nucleating agent is incorporated, a decrease in stiffness occurs in some cases.

(5) Plate-Like Inorganic Filler

In some embodiments, the polypropylene composition is further made from or containing not more than 2 parts by weight, alternatively not more than 1.5 parts by weight, alternatively not more than 1.2 parts by weight, of a plate-like inorganic filler, based on a total of 100 parts by weight of the resin components. In some embodiments, the plate-like inorganic filler enhances the stiffness of a composition. In some embodiments, the resin components contain the plate-like inorganic filler and the lower limit of its content is not specified, alternatively is not less than 0.1 parts by weight.

In some embodiments, the plate-like inorganic filler is selected from the group consisting of carbonates; hydroxides; oxides such as zinc oxide and magnesium oxide; synthetic silicic acids or silicates; and natural silicic acids or silicates. In some embodiments, the carbonates are selected from the group consisting of mica, clay, talc, kaolinite, glass flake, calcium carbonate and magnesium carbonate. In some embodiments, the hydroxides are selected from the group consisting of aluminum hydroxide and magnesium hydroxide. In some embodiments, the oxides are selected from the group consisting of zinc oxide and magnesium oxide. In some embodiments, the synthetic silicic acids or silicates are elected from the group consisting of hydrated calcium silicate, hydrated aluminum silicate, silicic acid hydrate and silicic acid anhydrate. In some embodiments, the natural silicic acid or silicate is selenite. In some embodiments, the plate-like inorganic filler is talc. In some embodiments, the plate-like inorganic fillers are used alone, or in combinations of two or more. In some embodiments, the plate-like inorganic filler has an average particle diameter of 1 to 10 m, alternatively 2 to 7 m. The average particle diameter is measured according to JIS Z 8825.

(6) Characteristics

1) XSIV

As used herein, the term "intrinsic viscosity of xylene solubles (XSIV)" of the polypropylene composition refers to an index for the molecular weight of non-crystalline components in the composition. XSIV is determined by obtaining components soluble in xylene at 25° C. and measuring the intrinsic viscosity of the components. In some embodiments, XSIV is in the range of 1.0 to 3.0 dl/g. It is believed that when XSIV exceeds the upper limit, a decrease in gloss occurs. It is believed that when XSIV falls below the lower limit, preparation of the polypropylene composition becomes difficult. In some embodiments, the intrinsic viscosity is in the range of 1.0 to 2.0 dl/g.

2) MFR

In some embodiments, the MFR (melt mass-flow rate) of the polypropylene composition is in the range of 3 to 15 g/10 min., as measured at a temperature of 230° C. under a load of 2.16 kg. It is believed that when MFR exceeds the upper limit, a decrease in low temperature impact resistance occurs. It is believed that when MFR falls below the lower limit, injection molding of the polypropylene composition becomes difficult. In some embodiments, the lower limit of MFR is not less than 4 g/10 min, alternatively not less than 7 g/10 min.

3) Mw/Mn of XI

In some embodiments, the Mw/Mn value of xylene insolubles (XI) of the polypropylene composition, as measured by GPC, is in the range of 6 to 20. In some embodiments, the xylene insolubles are crystalline components of the polypropylene composition. In some embodiments, the Mw/Mn of XI serves as an index for molecular weight distribution of the polypropylene composition and is in the range of 6 to 20. In some embodiments, the lower limit of Mw/Mn of XI is not less than 7, alternatively not less than 8, alternatively not less than 9. In some embodiments, the upper limit is 15 or less, alternatively 12 or less. It is believed that when Mw/Mn of XI exceeds the upper limit, the preparation of the polypropylene composition becomes difficult. In some embodiments, Mw/Mn of XI is determined by obtaining components insoluble in xylene at 25° C. and subjecting the insoluble components to measurement by GPC (gel permeation chromatography).

4) Structure

In some embodiments, the polypropylene composition has a phase structure wherein component (2) is dispersed in component (1).

(7) Other Components

In some embodiments, the polypropylene composition is further made from or containing additives. In some embodiments, the additives are selected from the group consisting of antioxidant, chlorine absorber, heat-resistant stabilizer, light stabilizer, ultraviolet absorber, internal lubricant, external lubricant, antiblocking agent, antistatic agent, antifogging agent, flame retardant, dispersant, copper inhibitor, neutralizer, plasticizer, foam inhibitor, crosslinking agent, peroxide, extender oil, and other organic pigments and other inorganic pigments besides the plate-like inorganic filler. In some embodiments, the polypropylene composition is further made from or containing one or more types of resin or rubber other than the resin components. In some embodiments, a crystal nucleating agent is added through the use of a masterbatch made from or containing a crystal nucleating agent and an olefinic polymer. In some embodiments, the matrix polymer in the masterbatch is different from components (1) and (2) and the polypropylene composition is made from or containing the matrix polymer.

2. Production Method

In some embodiments, the resin components are obtained by a method including the step of polymerizing the starting monomers using a catalyst made from or containing (a) a solid catalyst made from or containing magnesium, titanium, a halogen, and a succinate-based compound serving as an internal electron donor compound, (b) an organoaluminum compound, and optionally (c) an external electron donor compound.

(1) Solid Catalyst (Component (a))

In some embodiments, component (a) is prepared by contacting a magnesium compound, a titanium compound, and an electron donor compound with each other.

In some embodiments, the titanium compound used to prepare component (a) is a tetravalent titanium compound represented by the formula: $Ti(OR)_gX_{4-g}$. In some embodiments, R is a hydrocarbon group, X is a halogen, and $0 \leq g \leq 4$. In some embodiments, the titanium compound is selected from the group consisting of titanium tetrahalides; alkoxytitanium trihalides; alkoxytitanium dihalides; trialkoxytitanium monohalides; and tetraalkoxytitaniums. In some embodiments, the titanium tetrahalides are selected from the group consisting of $TiCl_4$, $TiBr_4$, and $TiI_4$. In some embodiments, the alkoxytitanium trihalides are selected from the group consisting of $Ti(OCH_3)Cl_3$, $Ti(OC_2H_5)Cl_3$, $Ti(On-C_4H_9)Cl_3$, $Ti(OC_2H_5)Br_3$, and $Ti(OisoC_4H_9)Br_3$. In some embodiments, the alkoxytitanium dihalides are selected from the group consisting of $Ti(OCH_3)_2Cl_2$, $Ti(OC_2H_5)_2Cl_2$, $Ti(On-C_4H_9)_2Cl_2$, and $Ti(OC_2H_5)_2Br_2$. In some embodiments, the trialkoxytitanium monohalides are selected from the group consisting of $Ti(OCH_3)_3Cl$, $Ti(OC_2H_5)_3Cl$, $Ti(On-C_4H_9)_3Cl$, and $Ti(OC_2H_5)_3Br$. In some embodiments, the tetraalkoxytitaniums are selected from the group consisting of $Ti(OCH_3)_4$, $Ti(OC_2H_5)_4$, and $Ti(On-C_4H_9)_4$. In some embodiments, the titanium compounds are halogen-containing titanium compounds, alternatively titanium tetrahalogenides, alternatively titanium tetrachlorides.

In some embodiments, the magnesium compound used to prepare component (a) is selected from the group consisting of magnesium compounds having a magnesium-carbon bond or a magnesium-hydrogen bond. In some embodiments, the magnesium compound having a magnesium-carbon bond or a magnesium-hydrogen bond is selected from the group consisting of dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, and butylmagnesium hydride. In some embodiments, the magnesium compounds are used in the form of a complex compound with an organoaluminum or the like. In some embodiments, the magnesium compounds are used in liquid or solid form. In some embodiments, the magnesium compound are selected from the group consisting of magnesium halides; alkoxymagnesium halides; aryloxymagnesium halides; alkoxymagnesiums; aryloxymagnesiums; and magnesium carboxylates. In some embodiments, the magnesium halides are selected from the group consisting of magnesium chloride, magnesium bromide, magnesium iodide, and magnesium fluoride. In some embodiments, the alkoxymagnesium halides are selected from the group consisting of methoxymagnesium chloride, ethoxymagnesium chloride, isopropoxymagnesium chloride, butoxymagnesium chloride, and octoxymagnesium chloride. In some embodiments, the aryloxymagnesium halides are selected from the group consisting of phenoxymagnesium chloride and methylphenoxymagnesium chloride. In some embodiments, the alkoxymagnesiums are selected from the group consisting of ethoxymagnesium, isopropoxymagnesium, butoxymagnesium, n-octoxymagnesium, and 2-ethylhexoxymagnesium. In some embodiments, the aryloxymagnesiums are selected from the group consisting of phenoxymagnesium and dimethylphenoxymagnesium. In some embodiments, the magnesium carboxylates are selected from the group consisting of magnesium laurate and magnesium stearate.

In some embodiments, the electron donor compound used to prepare component (a) is referred to as an "internal electron donor compound." In some embodiments, a succinate-based compound is used as an internal electron donor compound.

As used herein, the term "succinate-based compounds" refers to diesters of succinic acid or diesters of substituted succinic acid. In some embodiments, the succinate-based compounds are represented by formula (I) shown below:

[Chem. 1]

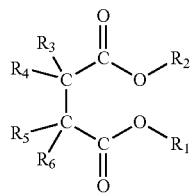

(I)

In this formula, the groups $R_1$ and $R_2$ are the same as or different from each other, and are each a $C_1$ to $C_{20}$ linear or branched alkyl, alkenyl, cycloalkyl, aryl, arylalkyl, or alkylaryl group optionally containing a heteroatom; and the groups $R_3$ to $R_6$ are the same as or different from each other, and are each a hydrogen or a $C_1$ to $C_{20}$ linear or branched alkyl, alkenyl, cycloalkyl, aryl, arylalkyl, or alkylaryl group optionally containing a heteroatom. In some embodiments, the groups $R_3$ to $R_6$ attached to the same carbon atom or to different carbon atoms form a ring.

In some embodiments, $R_1$ and $R_2$ are $C_1$ to $C_8$ alkyl, cycloalkyl, aryl, arylalkyl, or alkylaryl groups. In some embodiments, $R_1$ and $R_2$ are selected from primary alkyls, alternatively branched primary alkyls. In some embodiments, the groups $R_1$ and $R_2$ are selected from the group consisting of $C_1$ to $C_8$ alkyl groups. In some embodiments, the $C_1$ to $C_8$ alkyl groups are selected from the group consisting of methyl, ethyl, n-propyl, n-butyl, isobutyl, neopentyl, and 2-ethylhexyl. In some embodiments, the $C_1$ to $C_8$ alkyl groups are selected from the group consisting of ethyl, isobutyl, and neopentyl.

In some embodiments, $R_3$ to $R_5$ are each hydrogen, and $R_6$ is a branched alkyl, cycloalkyl, aryl, arylalkyl, or alkylaryl group having 3 to 10 carbon atoms. In some embodiments, the monosubstituted succinate compounds are selected from the group consisting of diethyl-sec-butyl succinate, diethyl thexylsuccinate, diethyl cyclopropylsuccinate, diethyl norbornylsuccinate, diethyl perihydrosuccinate, diethyl trimethylsilylsuccinate, diethyl methoxysuccinate, diethyl-p-methoxyphenylsuccinate, diethyl-p-chlorophenylsuccinate, diethyl phenylsuccinate, diethyl cyclohexylsuccinate, diethyl benzylsuccinate, diethyl cyclohexylmethylsuccinate, diethyl-t-butylsuccinate, diethyl isobutylsuccinate, diethyl isopropylsuccinate, diethyl neopentylsuccinate, diethyl isopentylsuccinate, diethyl (1-trifluoromethylethyl)succinate, diethyl fluorenylsuccinate, 1-ethoxycarbo diisobutyl phenylsuccinate, diisobutyl-sec-butylsuccinate, diisobutyl thexylsuccinate, diisobutyl cyclopropylsuccinate, diisobutyl norbornylsuccinate, diisobutyl perihydrosuccinate, diisobutyl trimethylsilylsuccinate, diisobutyl methoxysuccinate, diisobutyl-p-methoxyphenylsuccinate, diisobutyl-p-chlorophenylsuccinate, diisobutyl cyclohexylsuccinate, diisobutyl benzylsuccinate, diisobutyl cyclohexylmethylsuccinate, diisobutyl-t-butylsuccinate, diisobutyl isobutylsuccinate, diisobutyl isopropylsuccinate, diisobutyl neopentylsuccinate, diisobutyl isopentylsuccinate, diisobutyl (1-trifluoromethylethyl)succinate, diisobutyl fluorenylsuccinate, dineopentyl-sec-butyl-succinate, dineopentyl thexylsuccinate, dineopentyl cyclopropylsuccinate, dineopentyl norbornylsuccinate, dineopentyl perihydrosuccinate, dineopentyl trimethylsilylsuccinate, dineopentyl methoxysuccinate, dineopentyl-p-methoxyphenylsuccinate, dineopentyl-p-chlorophenylsuccinate, dineopentyl phenylsuccinate, dineopentyl cyclohexylsuccinate, dineopentyl benzylsuccinate, dineopentyl cyclohexylmethylsuccinate, dineopentyl-t-butylsuccinate, dineopentyl isobutylsuccinate, dineopentyl isopropylsuccinate, dineopentyl neopentylsuccinate, dineopentyl isopentylsuccinate, dineopentyl (1-trifluoromethylethyl)succinate, and dineopentyl fluorenylsuccinate.

In some embodiments, at least two of the groups $R_3$ to $R_6$ are different from hydrogen, and are selected from $C_1$ to $C_{20}$ linear or branched alkyl, alkenyl, cycloalkyl, aryl, arylalkyl, or alkylaryl groups optionally containing a heteroatom. In some embodiments, the two groups different from hydrogen are attached to the same carbon atom. In some embodiments, $R_3$ and $R_4$ are groups different from hydrogen, and $R_5$ and $R_6$ are hydrogen atoms. In some embodiments, the disubstituted succinate compounds are selected from the group consisting of diethyl-2,2-dimethylsuccinate, diethyl-2-ethyl-2-methylsuccinate, diethyl-2-benzyl-2-isopropylsuccinate, diethyl-2-cyclohexylmethyl-2-isobutylsuccinate, diethyl-2-cyclopentyl-2-n-butylsuccinate, diethyl-2,2-diisobutylsuccinate, diethyl-2-cyclohexyl-2-ethylsuccinate, diethyl-2-isopropyl-2-methylsuccinate, diethyl-2-tetradecyl-2-ethylsuccinate, diethyl-2-isobutyl-2-ethylsuccinate, diethyl-2-(1-trifluoromethylethyl)-2-methylsuccinate, diethyl-2-isopentyl-2-isobutylsuccinate, diethyl-2-phenyl-2-n-butylsuccinate, diisobutyl-2,2-dimethylsuccinate, diisobutyl-2-ethyl-2-methylsuccinate, diisobutyl-2-benzyl-2-isopropylsuccinate, diisobutyl-2-cyclohexylmethyl-2-isobutylsuccinate, diisobutyl-2-cyclopentyl-2-n-butylsuccinate, diisobutyl-2,2-diisobutylsuccinate, diisobutyl-2-cyclohexyl-2-ethylsuccinate, diisobutyl-2-isopropyl-2-methylsuccinate, diisobutyl-2-tetradecyl-2-ethylsuccinate, diisobutyl-2-isobutyl-2-ethylsuccinate, diisobutyl-2-(1-trifluoromethylethyl)-2-methylsuccinate, diisobutyl-2-isopentyl-2-isobutylsuccinate, diisobutyl-2-phenyl-2-n-butylsuccinate, dineopentyl-2,2-dimethylsuccinate, dineopentyl-2-ethyl-2-methylsuccinate, dineopentyl-2-benzyl-2-isopropylsuccinate, dineopentyl-2-cyclohexylmethyl-2-isobutylsuccinate, dineopentyl-2-cyclopentyl-2-n-butylsuccinate, dineopentyl-2,2-diisobutylsuccinate, dineopentyl-2-cyclohexyl-2-ethylsuccinate, dineopentyl-2-isopropyl-2-methylsuccinate, dineopentyl-2-tetradecyl-2-ethylsuccinate, dineopentyl-2-isobutyl-2-ethylsuccinate, dineopentyl-2-(1-trifluoromethylethyl)-2-methylsuccinate, dineopentyl-2-isopentyl-2-isobutylsuccinate, and dineopentyl-2-phenyl-2-n-butylsuccinate.

In some embodiments, at least two groups different from hydrogen are attached to different carbon atoms. In some embodiments, $R_3$ and $R_5$ are groups different from hydrogen. In some embodiments, $R_4$ and $R_6$ are hydrogen atoms or groups different from hydrogen. In some embodiments, $R_4$ or $R_6$ is a hydrogen atom (trisubstituted succinates). In some embodiments, the compounds are selected from the group consisting of diethyl-2,3-bis(trimethylsilyl)succinate, diethyl-2,2-sec-butyl-3-methylsuccinate, diethyl-2-(3,3,3-trifluoropropyl)-3-methylsuccinate, diethyl-2,3-bis(2-ethylbutyl)succinate, diethyl-2,3-diethyl-2-isopropylsuccinate, diethyl-2,3-diisopropyl-2-methylsuccinate, diethyl-2,3-dicyclohexyl-2-methyldiethyl-2,3-dibenzylsuccinate, diethyl-2,3-diisopropylsuccinate, diethyl-2,3-bis(cyclohexylmethyl)

succinate, diethyl-2,3-di-t-butylsuccinate, diethyl-2,3-diisobutylsuccinate, diethyl-2,3-dineopentylsuccinate, diethyl-2,3-diisopentylsuccinate, diethyl-2,3-(1-trifluoromethylethyl)succinate, diethyl-2,3-tetradecylsuccinate, diethyl-2,3-fluorenylsuccinate, diethyl-2-isopropyl-3-isobutylsuccinate, diethyl-2-tert-butyl-3-isopropylsuccinate, diethyl-2-isopropyl-3-cyclohexylsuccinate, diethyl-2-isopentyl-3-cyclohexylsuccinate, diethyl-2-tetradecyl-3-cyclohexylmethylsuccinate, diethyl-2-cyclohexyl-3-cyclopentylsuccinate, diisobutyl-2,3-diethyl-2-isopropylsuccinate, diisobutyl-2,3-diisopropyl-2-methylsuccinate, diisobutyl-2,3-dicyclohexyl-2-methylsuccinate, diisobutyl-2,3-dibenzylsuccinate, diisobutyl-2,3-diisopropylsuccinate, diisobutyl-2,3-bis(cyclohexylmethyl)succinate, diisobutyl-2,3-di-t-butylsuccinate, diisobutyl-2,3-diisobutylsuccinate, diisobutyl-2,3-dineopentylsuccinate, diisobutyl-2,3-diisopentylsuccinate, diisobutyl-2,3-(1-trifluoromethylethyl)succinate, diisobutyl-2,3-tetradecylsuccinate, diisobutyl-2,3-fluorenylsuccinate, diisobutyl-2-isopropyl-3-isobutylsuccinate, diisobutyl-2-tert-butyl-3-isopropylsuccinate, diisobutyl-2-isopropyl-3-cyclohexylsuccinate, diisobutyl-2-isopentyl-3-cyclohexylsuccinate, diisobutyl-2-tetradecyl-3-cyclohexylmethylsuccinate, diisobutyl-2-cyclohexyl-3-cyclopentylsuccinate, dineopentyl-2,3-bis(trimethylsilyl)succinate, dineopentyl-2,2-sec-butyl-3-methylsuccinate, dineopentyl-2-(3,3,3-trifluoropropyl)-3-methylsuccinate, dineopentyl-2,3-bis(2-ethylbutyl)succinate, dineopentyl-2,3-diethyl-2-isopropylsuccinate, dineopentyl-2,3-diisopropyl-2-methylsuccinate, dineopentyl-2,3-dicyclohexyl-2-methylsuccinate, dineopentyl-2,3-dibenzylsuccinate, dineopentyl-2,3-diisopropylsuccinate, dineopentyl-2,3-bis(cyclohexylmethyl)succinate, dineopentyl-2,3-di-t-butylsuccinate, dineopentyl-2,3-diisobutylsuccinate, dineopentyl-2,3-dineopentylsuccinate, dineopentyl-2,3-diisopentylsuccinate, dineopentyl-2,3-(1-trifluoromethylethyl)succinate, dineopentyl-2,3-tetradecylsuccinate, dineopentyl-2,3-fluorenylsuccinate, dineopentyl-2-isopropyl-3-isobutylsuccinate, dineopentyl-2-tert-butyl-3-isopropylsuccinate, dineopentyl-2-isopropyl-3-cyclohexylsuccinate, dineopentyl-2-isopentyl-3-cyclohexylsuccinate, dineopentyl-2-tetradecyl-3-cyclohexylmethylsuccinate, and dineopentyl-2-cyclohexyl-3-cyclopentylsuccinate.

In some embodiments, some of the group R3 to R6 are joined together to form a ring. In some embodiments, the compounds are as described in Japanese Patent Application Publication No. JP 2002-542347. In some embodiments, the compounds are selected from the group consisting of 1-(ethoxycarbonyl)-1-(ethoxyacetyl)-2,6-dimethylcyclohexane, 1-(ethoxycarbonyl)-1-(ethoxyacetyl)-2,5-dimethylcyclopentane, 1-(ethoxycarbonyl)-1-(ethoxyacetylmethyl)-2-methylcyclohexane, and 1-(ethoxycarbonyl)-1-(ethoxy(cyclohexyl)acetyl)cyclohexane. In some embodiments, the cyclic succinate compounds are as described in Patent Cooperation Treaty Publication No. WO 2009/069483. In some embodiments, the cyclic succinate compounds are selected from the group consisting of diisobutyl 3,6-dimethylcyclohexane-1,2-dicarboxylate and diisobutyl cyclohexane-1,2-dicarboxylate. In some embodiments, the cyclic succinate compounds are as described in Patent Cooperation Treaty Publication No. WO 2009/057747.

In some embodiments, the groups $R_3$ to $R_6$ contain a heteroatom. In some embodiments, the heteroatom is a Group 15 atom or a Group 16 atom. In some embodiments, the Group 15 atom is nitrogen or phosphorus. In some embodiments, the Group 16 atom is oxygen or sulfur. In some embodiments, the groups $R_3$ to $R_6$ contain a Group 15 atom are selected from the compounds described in Japanese Patent Application Publication No. JP 2005-306910. In some embodiments, the groups $R_3$ to $R_6$ contain a Group 16 atom are selected from the compounds described in Japanese Patent Application Publication No. JP 2004-131537.

In some embodiments, other internal electron donor compounds that provide a molecular weight distribution comparable to the molecular weight distribution provided by the succinate-based compounds are used. In some embodiments, the other compounds are selected from the group consisting of diphenyl dicarboxylic acid esters, cyclohexene dicarboxylic acid esters, dicycloalkyl dicarboxylic acid esters, diol dibenzoates, and 1,2-phenylene dibenzoates. In some embodiments, the diphenyl dicarboxylic acid esters are as described in Japanese Patent Application Publication No. JP 2013-28704. In some embodiments, the cyclohexene dicarboxylic acid esters are as described in Japanese Patent Application Publication No. JP 2014-201602. In some embodiments, the adicycloalkyl dicarboxylic acid esters are as described in Japanese Patent Application Publication No. JP 2013-28705. In some embodiments, the diol dibenzoates are as described in Japanese Patent No. 4959920. In some embodiments, the 1,2-phenylene dibenzoates are as described in Patent Cooperation Treaty Publication No. WO 2010/078494.

(2) Organoaluminum Compound (Component (b))

In some embodiments, the organoaluminum compound as component (b) is selected from the group consisting of:
  trialkylaluminums;
  trialkenylaluminums;
  dialkylaluminum alkoxides;
  alkylaluminum sesquialkoxides;
  partially halogenated alkylaluminums;
  dialkylaluminum hydrides;
  partially hydrogenated alkylaluminums; and
  partially alkoxylated and halogenated alkylaluminums.

In some embodiments, the trialkylaluminum is selected from the group consisting of triethylaluminum and tributylaluminum. In some embodiments, the trialkenylaluminum is triisoprenylaluminum. In some embodiments, the dialkylaluminum alkoxides are selected from the group consisting of diethylaluminum ethoxide and dibutylaluminum butoxide. In some embodiments, the alkylaluminum sesquialkoxides are selected from the group consisting of ethylaluminum sesquiethoxide and butylaluminum sesquibutoxide. In some embodiments, the partially halogenated alkylaluminum is selected from the group consisting of alkylaluminum dihalogenides. In some embodiments, the alkylaluminum dihalogenide is selected from the group consisting of ethylaluminum dichloride, propylaluminum dichloride, and butylaluminum dibromide. In some embodiments, the dialkylaluminum hydrides are selected from the group consisting of diethylaluminum hydride and dibutylaluminum hydride. In some embodiments, the partially hydrogenated alkylaluminums are selected from the group of alkylaluminum dihydrides. In some embodiments, the alkylaluminum dihydrides are selected from the group consisting of ethylaluminum dihydride and propylaluminum dihydride. In some embodiments, the partially alkoxylated and halogenated alkylaluminum is selected from the group consisting of ethylaluminum ethoxychloride, butylaluminum butoxychloride, and ethylaluminum ethoxybromide.

(3) Electron Donor Compound (Component (c))

As used herein, the electron donor compound as component (c) is referred to as an "external electron donor compound." In some embodiments, the catalyst is made from or containing component (c). In some embodiments, the catalyst is not made from or containing component (c). In some embodiments, the electron donor compound is an organosilicon compound. In some embodiments, the organosilicon compound is selected from the group consisting of.

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane), vinyltriacetoxysilane, dimethyltetraethoxydisiloxane, methyl(3,3,3-trifluoro-n-propyl)dimethoxysilane, cyclohexylethyldimethoxysilane, cyclopentyl-t-butoxydimethoxysilane, diisobutyldimethoxysilane, isobutylisopropyldimethoxysilane, n-propyltrimethoxysilane, di-n-propyldimethoxysilane, texyltrimethoxysilane, t-butylethyldimethoxysilane, t-butylpropyldimethoxysilane, t-butyl-t-butoxydimethoxysilane, isobutyltrimethoxysilane, cyclohexylisobutyldimethoxysilane, di-sec-butyldimethoxysilane, isobutylmethyldimethoxysilane, bis(decahydroisoquinolin-2-yl)dimethoxysilane, diethylaminotriethoxysilane, dicyclopentyl-bis(ethylamino)silane, tetraethoxysilane, tetramethoxysilane, and isobutyltriethoxysilane.

In some embodiments, the organosilicon compound is selected from the group consisting of ethyltriethoxysilane, n-propyltriethoxysilane, n-propyltrimethoxysilane, t-butyltriethoxysilane, t-butylmethyldimethoxysilane, t-butylmethyldiethoxysilane, t-butylethyldimethoxysilane, t-butylpropyldimethoxysilane, t-butyl-t-butoxydimethoxysilane, t-butyltrimethoxysilane, i-butyltrimethoxysilane, isobutylmethyldimethoxysilane, i-butyl-sec-butyldimethoxysilane, ethyl(perhydroisoquinolin-2-yl)dimethoxysilane, bis(decahydroisoquinolin-2-yl)dimethoxysilane, tri(isopropenyloxy)phenylsilane, thexyltrimethoxysilane, vinyltriethoxysilane, phenyltriethoxysilane, phenyltrimethoxysilane, vinyltributoxysilane, diphenyldimethoxysilane, diisopropyldimethoxysilane, diisobutyldimethoxysilane, i-butyl-1-propyldimethoxysilane, cyclopentyl-t-butoxydimethoxysilane, dicyclopentyldimethoxysilane, cyclohexylmethyldimethoxysilane, cyclohexyl-1-butyldimethoxysilane, cyclopentyl-1-butyldimethoxysilane, cyclopentylisopropyldimethoxysilane, di-sec-butyldimethoxysilane, diethylaminotriethoxysilane, tetraethoxysilane, tetramethoxysilane, isobutyltriethoxysilane, phenylmethyldimethoxysilane, phenyltriethoxysilane, bis-p-tolyldimethoxysilane, p-tolylmethyldimethoxysilane, dicyclohexyldimethoxysilane, cyclohexylethyldimethoxysilane, 2-norbornanetriethoxysilane, 2-norbornanemethyldimethoxysilane, diphenyldiethoxysilane, methyl(3,3,3-trifluoropropyl)dimethoxysilane, ethyl silicate, and the like.

(4) Polymerization

The starting monomers are polymerized by contact with the catalyst. In some embodiments, a pre-polymerization is first performed using the catalyst. Pre-polymerization is a step wherein a polymer chain serving as a foothold for subsequent polymerization of the starting monomers is formed on a solid catalyst component. In some embodiments, pre-polymerization is performed at not more than 40° C., alternatively at not more than 30° C., alternatively at not more than 20° C. Then, the pre-polymerized catalyst is introduced into a polymerization reaction system to perform polymerization of the starting monomers. In some embodiments, polymerization is performed by polymerizing the starting monomer of component (1) and the starting monomer of component (2) using two or more reactors. In some embodiments, the polymerization is performed in a liquid phase, a gas phase, or a liquid/gas phase. In some embodiments, the polymerization temperature is in the range of normal temperature to 150° C., alternatively in the range of 40° C. to 100° C. In some embodiments, the polymerization pressure is in the range of 3.3 to 6.0 MPa for polymerization in a liquid phase, alternatively in the range of 0.5 to 3.0 MPa for polymerization in a gas phase. In some embodiments, a molecular weight regulator is used. In some embodiments, the molecular weight regulator is a chain transfer. In some embodiments, the chain transfer agent is hydrogen or $ZnEt_2$.

In some embodiments, a polymerization apparatus having gradients in monomer concentration or polymerization conditions is used. In some embodiments, the monomers is polymerized in a gas phase using an apparatus having at least two interconnected polymerization zones. In some embodiments and in the presence of a catalyst, monomers are fed to a first polymerization zone including a riser and are polymerized in the first polymerization zone, while monomers are also fed to a second polymerization zone including a downcomer connected to the riser and are polymerized in the second polymerization zone, and then, as the monomers are circulated between the riser and downcomer, a polymer product is collected. In some embodiments, this method prevents totally or partially a gas mixture present in the riser from entering the downcomer. In some embodiments, a gas or liquid mixture that is different in chemical constitution from the gas mixture present in the riser is introduced into the downcomer. In some embodiments, the polymerization method is as described in Japanese Patent Application Publication No. JP 2002-520426.

3. Application

In some embodiments, the polypropylene composition is used as a resin composition for injection molding. In some embodiments, the polypropylene composition is injection-molded into a molded article having a thickness of 0.5 to 3 mm. In some embodiments, the polypropylene composition has the following physical properties.

1) Gloss: JIS Z8741

The gloss is a specular gloss value determined by measuring the surface of an injection-molded article at an incident angle of 60° according to JIS Z8741. In some embodiments, the gloss value is not less than 88%, alternatively not less than 90%. In some embodiments, the upper limit of gloss is not limited, alternatively not more than about 99%.

2) Stiffness: JIS K7171

In some embodiments, the polypropylene composition has a flexural modulus of not less than 1400 MPa, as determined by preparing a test piece according to JIS K6921-2 and measuring the test piece according to JIS K7171.

3) Low temperature impact resistance

In some embodiments, the polypropylene composition has a puncture resistance (−10° C.) of not less than 10 J.

In some embodiments, the polypropylene composition is used as housings of home electric appliances. In some embodiments, the polypropylene composition is directly injection-molded into a final product. In some embodiments, the polypropylene composition is made into a thin-wall article by extruding or injection-molding and then into a final product by providing the thin-wall article to a secondary processing. In some embodiments, the thin-wall article is a sheet. In some embodiment, the secondary processing is vacuum forming or pressure forming. In some embodiments, the polypropylene composition is used for miscellaneous goods.

EXAMPLES

Examples 1 and 3

A Ziegler-Natta catalyst was produced according to Example 1 of Patent Cooperation Treaty Publication No. WO 2009/050045. However, at the time of the first temperature elevation, the temperature was elevated to 110° C., instead of 100° C. The catalyst component, triethylaluminium (TEAL), and the external electron donor compound, dicyclopentyldimethoxysilane (DCPMS), were brought into contact with each other at 12° C. for 24 minutes. The weight ratio of TEAL to the solid catalyst component was 20, and the weight ratio of TEAL to DCPMS was 10. Before the catalyst system was introduced into a first polymerization reactor, the catalyst system was subjected to pre-polymerization by being suspended in liquid propylene and held at 20° C. for about 5 minutes.

The resulting prepolymerized product was introduced into a first-stage polymerization reactor in a polymerization apparatus having two stages of polymerization reactors connected in series, and then propylene was fed to the reactor, thereby producing a propylene homopolymer as component (1) in liquid phase. In a second-stage gas-phase polymerization reactor, ethylene and propylene were fed to produce an ethylene/propylene copolymer as component (2). During the polymerization, the polymerization temperatures of the first- and second-stage reactors were set to 75° C. and 80° C., respectively, and the pressures in the two reactors were also adjusted. Further, hydrogen was used as a molecular weight regulator, and the residence time distributions at the first and second stages were adjusted, thereby giving a specified ratio of component (1) to component (2). Table 1 shows the polymerization conditions for components (1) and (2), and the characteristic data of different compositions produced from these components.

To 100 parts by weight of the resulting resin components, 0.2 parts by weight of an antioxidant and 0.05 parts by weight of a neutralizer, were added. The antioxidant was BASF's B225. The neutralizer was Tannan Kagaku Kogyo Co., Ltd.'s calcium stearate. The contents were stirred and mixed for 1 minute using a Henschel mixer. The mixture was extruded at a cylinder temperature of 230° C. using an NVC φ50 mm single-screw extruder produced by Nakatani Machinery Ltd., and the extruded strands were cooled in water and cut by a pelletizer to obtain a polypropylene composition in a pellet form. The results of evaluating the sample are shown in Table 1.

Examples 2 and 4 and Comparative Example 7

Polypropylene compositions were produced and evaluated by the same procedure as in Example 1, except that the polymerization conditions were varied as shown in Table 1 and that in the process of melt-kneading of the resulting resin components, 0.20 parts by weight of a crystal nucleating agent and 1.0 parts by weight of a filler were additionally compounded to 100 parts by weight of the resin components. The crystal nucleating agent was ADEKA Corporation's ADK STAB NA18 phosphoric ester-based nucleating agent. The filler was IMI Fabi S.p.A.'s HTP05L talc.

Comparative Example 1

A Ziegler-Natta catalyst was produced according to the procedure disclosed in European Patent Publication No. EP 728769, Example 5, lines 48-55. A comparative polypropylene composition was produced using this catalyst and evaluated by the same procedure as in Example 1, except that the hydrogen concentration in the first-stage reactor and the hydrogen concentration and C2/(C2+C3) molar ratio in the second-stage reactor were set to the values shown in Table 1, and that 0.20 parts by weight of a crystal nucleating agent and 1.0 parts by weight of a filler were added to 100 parts by weight of the resin components. The crystal nucleating agent was ADEKA Corporation's ADK STAB NA18 phosphoric ester-based nucleating agent. The filler was IMI Fabi S.p.A.'s HTP05L talc.

Comparative Example 2

A comparative polypropylene composition was produced and evaluated by the same procedure as in Comparative Example 1, except that the hydrogen concentration in the first-stage reactor and the hydrogen concentration and C2/(C2+C3) molar ratio in the second-stage reactor were set to the values shown in Table 1, and that neither a filler nor crystal nucleating agents were added.

Comparative Example 3

A comparative polypropylene composition was produced and evaluated by the same procedure as in Comparative Example 1, except that the hydrogen concentration in the first-stage reactor and the $H_2/C2$ and C2/(C2+C4) molar ratios in the second-stage reactor, to which 1-butene instead of propylene was fed, were set to the values shown in Table 1, and that 0.20 parts by weight of a crystal nucleating agent was added to 100 parts by weight of the resin components, and no filler was added. The crystal nucleating agent was ADEKA Corporation's ADK STAB NA18 phosphoric ester-based nucleating agent.

Comparative Examples 4 and 5

Comparative polypropylene compositions were produced and evaluated by the same procedure as in Comparative Example 3, except that in the process of melt-kneading of the resulting resin components, 10 parts by weight (Comparative Example 4) or 20 parts by weight (Comparative Example 5) of a filler was additionally compounded to 100 parts by weight of the resin components. The filler was IMI Fabi S.p.A.'s HTP05L talc.

Comparative Example 6

A polymer composed of homo-polypropylene and an ethylene/1-butene copolymer was produced by the same procedure as in Comparative Example 3, except that the hydrogen concentration in the first-stage reactor and the C2/(C2+C4) molar ratio in the second-stage reactor were set to 0.04 mol. % and 0.48, respectively, and that the residence time distributions at the first and second stages were adjusted, thereby giving a specified ratio of component (1) to component (2). A mixture was prepared consisting of 30 parts by weight of the resulting polymer with a MFR of 3.0, 40 parts by weight of SunAllomer Ltd.'s PX600N homo-polypropylene with a MFR of 7.5, and 30 parts by weight of the polymer produced in Comparative Example 1. To 100 parts by weight of the mixture, 0.20 parts by weight of an antioxidant and 0.05 parts by weight of a neutralizer were added. The antioxidant was BASF's B225. The neutralizer was Tannan Kagaku Kogyo Co., Ltd.'s calcium stearate. The contents were stirred and mixed for 1 minute using a Henschel mixer. Then, by following the same procedures as in Example 1, the mixture was melt-kneaded and pelletized. The resulting composition was evaluated.

[Measurement Conditions]

1) MFR

MFR measurement was done at a temperature of 230° C. under a load of 2.16 kg according to JIS K7210-1.

2) Ethylene-derived unit content in component (2) and amount of component (2) in polypropylene composition $^{13}$C-NMR measurements were performed on a sample dissolved in a mixed solvent of 1,2,4-trichlorobenzene and deuterated benzene at 120° C. The $^{13}$C-NMR spectra were acquired on a Bruker AVANCE III HD 400 spectrometer operating at $^{13}$C resonance frequency 100 MHz using a flip angle of 45°, a pulse interval of 7 seconds, a sample rotation number of 20 Hz, and an accumulation number of 5000 times.

2-1) Evaluation: Component (2) was an Ethylene/Propylene Copolymer

Using the spectrum, the total ethylene content in the composition (% by weight) was determined by the method described in the literature: M. Kakugo, Y. Naito, K. Mizunuma and T. Miytake, Macromolecules, 15, 1150-1152 (1982). The ethylene-derived unit content of the component (2) of the composition (% by weight) was calculated in the same manner as the total ethylene-derived unit content except that the integrated intensity of $T'_{\beta\beta}$ obtained by the following formula was used instead of the integral intensity of $T_{\beta\beta}$ obtained above.

$$T'_{\beta\beta} = 0.98 \times S_{\alpha\gamma} \times A/(1 - 0.98 \times A)$$

Where $A = S_{\alpha\gamma}/(S_{\alpha\gamma} + S_{\alpha\delta})$

The amount of the component (2) in the composition was obtained by the following equation.

Amount of component (2) (% by weight)=Total ethylene-derived unit content/(Ethylene-derived unit content of component (2)/100).

2-2) Evaluation: Component (2) was an Ethylene/1-Butene Copolymer

According to the method described in the page 15-16 of Patent Cooperation Treaty Publication No. WO 2011/134897, the ethylene-derived unit content of the component (2) of the composition was determined.

Diad distribution was calculated from the $^{13}$C NMR spectra using the following relations:

$$PP = 100 I_1/\Sigma$$

$$PB = 100 I_2/\Sigma$$

$$BB = 100(I_3 - I_{19})/\Sigma$$

$$PE = 100(I_5 + I_6)/\Sigma$$

$$BE = 100(I_9 + I_{10})/\Sigma$$

$$EE = 100(0.5(I_{15} + I_6 + I_{10}) + 0.25(I_{14}))/\Sigma$$

Where $E = I_1 + I_2 + I_3 - I_{19} + I_5 + I_6 + I_9 + I_{10} + 0.5(I_{15} + I_6 + I_{10}) + 0.25(I_{14})$ The molar content was obtained from diads using the following relations:

$$P(\text{mol }\%) = PP + 0.5(PE + PB)$$

$$B(\text{mol }\%) = BB + 0.5(BE + PB)$$

$$E(\text{mol }\%) = EE + 0.5(PE + BE)$$

$I_1, I_2, I_3, I_5, I_6, I_9, I_{10}, I_{14}, I_{15}, I_{19}$ were integrals of the peaks in the $^{13}$C NMR spectrum (peak of EEE sequence at 29.9 ppm as reference). The assignments of these peaks were made according to J. C. Randal, Macromol. Chem Phys., C29, 201 (1989), M. Kakugo, Y. Naito, K. Mizunuma and T. Miyatake, Macromolecules, 15, 1150 (1982), and H. N. Cheng, Journal of Polymer Science, Polymer Physics Edition, 21, 57 (1983) and collected in Table A (nomenclature according to C. J. Carman, R. A. Harrington and C. E. Wilkes, Macromolecules, 10, 536 (1977)). The ethylene-derived unit content of the component (2) of the composition was obtained by the following equation.

Ethylene-derived unit content of the component (2) (% by weight)=100$E$ (wt %)/($E$ (wt %)+$B$ (wt %))

Where E (wt %) and B (wt %) were ethylene- and 1-butene-derived unit converted to % by weight, respectively.

The amount of the component (2) in the composition was obtained by the following equation.

Amount of component (2) (% by weight)=$E$ (wt %)+$B$ (wt %)

3) Intrinsic Viscosity of Xylene Solubles (XSIV) of Polypropylene Composition

Xylene solubles were obtained from the polypropylene resin samples and measured for intrinsic viscosity (XSIV).

First, 2.5 g of a polypropylene sample was put into a flask containing 250 mL of o-xylene (solvent), and the contents were stirred at 135° C. for 30 minutes under nitrogen purging using a hot plate and a reflux condenser, whereby the composition was dissolved completely; thereafter, the solution was cooled at 25° C. for one hour. The resulting solution was filtered through a paper filter. 100 mL of the filtrate obtained after filtration was collected, transferred to an aluminum cup, evaporated to dryness at 140° C. under nitrogen purging, and left to stand at room temperature for 30 minutes, whereby xylene solubles were obtained.

Intrinsic viscosity measurement was done in tetrahydronaphthalene at 135° C. using an automatic capillary viscometer (SS-780-H$_1$, produced by Shibayama Scientific Co., Ltd.).

4) Mw/Mn of Xylene Insolubles (XI)

When the xylene solubles were filtered, residues (a mixture of xylene insolubles and the solvent) remaining on the paper filter were collected. After acetone was added to the residues, the mixture was filtrated through the filter, and components that did not pass though the filter were evaporated to dryness in a vacuum drying oven set at 80° C., thereby obtaining xylene insolubles (XI).

The xylene insolubles were used as a sample and measured for molecular weight distribution (Mw/Mn). Mw/Mn is a value obtained through measurement of weight-average molecular weight (Mw) and number-average molecular weight (Mn) by gel permeation chromatography (GPC). PL GPC220 produced by Polymer Laboratories Ltd. was used as a GPC system, and 1,2,4-trichlorobenzene containing an antioxidant was used as a mobile phase. The columns used were UT-G (one column), UT-807 (one column) and UT-806M (two columns) produced by Showa Denko K.K., which were connected in series. A differential refractometer was used as a detector. The same solvent as used as a mobile phase was also used to prepare a sample solution of xylene insolubles. The xylene insolubles were dissolved in the solvent with shaking at 150° C. for 2 hours at a sample concentration of 1 mg/mL. 500 μL of the sample solution was injected into the columns and measurement was performed at a flow rate of 1.0 mL/min., a temperature of 145° C., and a data collection interval of 1 sec. Column calibration was performed using polystyrene standards with molecular weights of 580 to $745 \times 10^4$ (Shodex STANDARD, produced by Showa Denko K.K.) based on the cubic spline technique. The Mark-Houwink-Sakurada coefficients used were $K=1.21 \times 10^{-4}$, $\alpha=0.707$ for polystyrene standards, and $K=1.37 \times 10^{-4}$, $\alpha=0.75$ for polypropylene-based polymers.

5) Gloss

Small plate test pieces (type D2) with a thickness of 2 mm as per JIS K7152-3 were prepared using an injection molding machine (FANUC ROBOSHOT S-2000i produced by Fanuc Corporation). According to JIS Z8741, the opposite surface of the test pieces to the gate was measured using a gloss meter (GM-26PRO) produced by Murakami Color Research Laboratory Co., Ltd., thereby determining the specular gloss of the test pieces at an incident angle of 60°. The molding conditions were as follows.

Molten resin temperature: 230° C. for compositions with a MFR <7 g/10 min., and 200° C. for compositions with a MFR≥7 g/10 min.

Mold temperature: 40° C.

Average injection speed: 200 mm/sec.

Hold pressure time: 40 sec.

Total cycle time: 60 sec.

6) Flexural Modulus

According to JIS K6921-2, multi-purpose test pieces (type A1) as per JIS K7139 were injection-molded from the polypropylene composition samples using an injection molding machine (FANUC ROBOSHOT S-2000i produced by Fanuc Corporation), and processed into a dimension of 10 mm wide, 4 mm thick and 80 mm long, thereby obtaining test pieces (type B2). The type B2 test pieces were measured for flexural modulus using a precision universal testing machine (Autograph AG-X 10 kN) produced by Shimadzu Corporation under the following conditions: temperature, 23° C.; relative humidity, 50%; length of span between supports, 64 mm; and test speed, 2 mm/min.

7) Spiral Flow

Molding flowability was evaluated by spiral flow testing. The values of spiral flow were determined by measuring the flow length of injection-molded articles obtained using an injection molding machine (FANUC ROBOSHOT α-100C produced by Fanuc Corporation) equipped with a spiral flow mold (flow path cross-sectional profile: a trapezoid with an upper base length of 8 mm, a lower base length of 10 mm, and a height of 2 mm) having an Archimedes spiral formed thereon. The molding conditions were as follows.

Cylinder temperature: 230° C.

Mold temperature: 40° C.

Injection pressure: 73.5 MPa

Injection speed: 10 mm/sec.

Hold pressure: 73.5 MPa (for 3 sec.)

Cooling time: 8 sec.

8) Charpy Impact Strength

Type A test pieces were obtained by the same procedure as for flexural modulus measurement. According to JIS K7111-1, the test pieces were processed into a dimension of 10 mm wide, 4 mm thick and 80 mm long and then cut to form a notch 2 mm deep in width direction using a notching tool A-3 produced by Toyo Seiki Seisaku-sho, Ltd., whereby test pieces having form A were obtained. According to JIS K6921-2, the test pieces were measured for Charpy impact strength using a digital impact tester DG-UB produced by Toyo Seiki Seisaku-sho, Ltd. under the following conditions: temperature, 23° C.; edge-wise impact; and 1 eA method.

9) Puncture Resistance

Flat plates of 130 mm×130 mm×2.0 mm were prepared using an injection molding machine (FANUC ROBOSHOT α-100C produced by Fanuc Corporation). With the use of Hydroshot HITS-P10 produced by Shimadzu Corporation, each test piece was placed on a support with a hole of 40 mmφ internal diameter in a thermostatic bath controlled at –10° C., secured with a sample holder of 76 mmφ internal diameter, and then struck by a striker of 12.7 mmφ diameter with a hemispherical striking face at an impact velocity of 1 m/sec, thereby determining puncture energy (J) according to JIS K7211-2. An average of the puncture energy values obtained for four test pieces was calculated as a puncture resistance and used as an index for low temperature impact resistance.

The molding conditions were as follows.

Molten resin temperature: 230° C.

Mold temperature: 40° C.

Average injection speed: 35 mm/sec.

Hold pressure time: 10 sec.

Total cycle time: 45 sec.

TABLE 1

| | | Examples | | | | Comparative Examples |
|---|---|---|---|---|---|---|
| | | 1 | 2 | 3 | 4 | 1 |
| Polymerization | Catalyst [1] | Suc | Suc | Suc | Suc | Ph |
| | Hydrogen conc. at 1st stage (mol %) | 0.24 | 0.30 | 0.26 | 0.23 | 0.93 |
| | H2/C2 at 2nd stage (molar ratio) | 0.232 | 0.232 | 0.332 | 0.332 | — |
| | Hydrogen conc. at 2nd stage (mol %) | — | — | — | — | 1.33 |
| | C2/(C2 + C3 (C4)) at 2nd stage (molar ratio) | 0.68 | 0.68 | 0.72 | 0.72 | 0.43 |

TABLE 1-continued

|  |  |  |  |  |  |  |
|---|---|---|---|---|---|---|
| Composition | Ethylene content in component (1) (wt %) | 0 | 0 | 0 | 0 | 0 |
|  | Type of component (2) [2] | C2C3 | C2C3 | C2C3 | C2C3 | C2C3 |
|  | Ethylene content in component (2) (wt %) | 72 | 72 | 76 | 76 | 44 |
|  | Content of component (2) (wt %) | 21 | 18 | 22 | 18 | 13 |
|  | XS IV (dl/g) | 1.7 | 1.7 | 1.4 | 1.4 | 2.8 |
|  | XI Mw/Mn | 10 | 10 | 10 | 10 | 5 |
|  | MFR (g/10 min) | 9 | 12 | 12 | 9 | 20 |
|  | Crystal nucleating agent (parts by wt) | 0 | NA18: 0.20 | 0 | NA18: 0.20 | NA18: 0.20 |
|  | Talc (parts by wt) | 0 | 1.0 | 0 | 1.0 | 1.0 |
| Properties | Gloss (60°) | 91 | 91 | 92 | 90 | 80 |
|  | Flexural modulus (MPa) | 1470 | 1790 | 1510 | 1870 | 1700 |
|  | Charpy impact strength @ 23° C. (KJ/m$^2$) | 6 | 6 | 4 | 4 | 7 |
|  | Puncture resistance @ −10° C. (J) | 17 | 14 | 16 | 11 | 15 |
|  | Spiral flow (cm) | 56 | 60 | 60 | 56 | 61 |

|  |  | Comparative Examples | | | | | |
|---|---|---|---|---|---|---|---|
|  |  | 2 | 3 | 4 | 5 | 6 | 7 |
| Polymerization | Catalyst [1] | Ph | Ph | Ph | Ph | Ph | Suc |
|  | Hydrogen conc. at 1st stage (mol %) | 1.11 | 0.40 | — | — | — | 0.25 |
|  | H2/C2 at 2nd stage (molar ratio) | — | — | 0.249 | — | — | — |
|  | Hydrogen conc. at 2nd stage (mol %) | 2.45 | — | — | — | — | 1.75 |
|  | C2/(C2 + C3 (C4)) at 2nd stage (molar ratio) | 0.40 | — | 0.59 | — | — | 0.02 |
| Composition | Ethylene content in component (1) (wt %) | 0 | 0 | 0 | 0/0 | 0 | 0 |
|  | Type of component (2) [2] | C2C3 | C2C3 | C2C4 | C2C3/C2C4 | C2C3 | C2C3 |
|  | Ethylene content in component (2) (wt %) | 41 | 81 | 44/75 | 6 | | |
|  | Content of component (2) (wt %) | 19 | 34 | 13/30 | 10 | | |
|  | XS IV (dl/g) | 2.0 | 1.2 | 2.8/1.2 | 2.4 | | |
|  | XI Mw/Mn | 5 | 5 | 7 | 10 | | |
|  | MFR (g/10 min) | 30 | 18 | 7 | 8 | | |
|  | Crystal nucleating agent (parts by wt) | 0 | NA18: 0.20 | 0 | NA18: 0.20 | | |
|  | Talc (parts by wt) | 0 | 0 | 10 | 20 | 0 | 1.0 |
| Properties | Gloss (60°) | 82 | 86 | 82 | 74 | 85 | 88 |
|  | Flexural modulus (MPa) | 1170 | 1110 | 1440 | 1790 | 1440 | 1710 |
|  | Charpy impact strength @ 23° C. (KJ/m$^2$) | 7 | 41 | 10 | 9 | 7 | 6 |
|  | Puncture resistance @ −10° C. (J) | >25 | >25 | 9 | 14 | 16 | <0.5 |
|  | Spiral flow (cm) | 70 | 63 | — | — | 48 | 54 |

[1] Suc: Catalyst using a succinate-based compound Ph: Catalyst using a phthalate-based compound
[2] C2C3: Ethylene/propylene copolymer C2C4: Ethylene/1-butene copolymer

What is claimed is:

1. A polypropylene composition comprising:
(i) component (1) comprising a propylene homopolymer or copolymer containing 0 to 0.5% by weight of an ethylene-derived unit, based upon the total weight of the propylene homopolymer or copolymer; and
(ii) component (2) comprising an ethylene/propylene copolymer containing 65 to 85% by weight of an ethylene-derived unit, based upon the total weight of the ethylene/propylene copolymer;
wherein the polypropylene composition has:
1) a Mw/Mn value of xylene insolubles (XI) of the polypropylene composition as measured by GPC is in the range of 6 to 20,
2) a weight ratio of component (1) to component (2) is 75:25 to 79:21,
3) an intrinsic viscosity, measured in tetrahydronaphthalene at 135° C., of xylene solubles (XSIV) of the polypropylene composition is 1.0 to 3.0 dl/g, and
4) a MFR (at 230° C. under a load of 2.16 kg) of the polypropylene composition is 3 to 15 g/10 min.

2. The polypropylene composition according to claim 1, wherein components (1) and (2) are polymers obtained by polymerizing propylene and ethylene using a catalyst comprising:

(a) a solid catalyst comprising magnesium, titanium, a halogen, and an electron donor compound selected from succinate-based compounds,
(b) an organoaluminum compound, and optionally
(c) an external electron donor compound.

3. The polypropylene composition according to claim 1, further comprising 0.01 to 1.0 parts by weight of a crystal nucleating agent based on a total of 100 parts by weight of component (1) and component (2).

4. The polypropylene composition according to claim 3, wherein the crystal nucleating agent is selected from the group consisting of phosphoric ester-based nucleating agents, triaminobenzene derivative-based nucleating agents, and combinations thereof.

5. The polypropylene composition according to claim 1, further comprising not more than 2 parts by weight of a plate-like inorganic filler based on a total of 100 parts by weight of component (1) and component (2).

6. An injection-molded article comprising the polypropylene composition according to claim 1.

* * * * *

UNITED STATES PATENT AND TRADEMARK OFFICE
CERTIFICATE OF CORRECTION

PATENT NO. : 11,807,744 B2
APPLICATION NO. : 17/285838
DATED : November 7, 2023
INVENTOR(S) : Nakajima et al.

It is certified that error appears in the above-identified patent and that said Letters Patent is hereby corrected as shown below:

In the Specification

In Column 4, Line 53, delete "1 to 10 m" and insert -- 1 to 10 μm --, therefor

In Column 4, Line 54, delete "2 to 7 m" and insert -- 2 to 7 μm --, therefor

In Column 6, Line 16, delete "Ti(On-C$_4$H$_9$)Cl$_3$" and insert -- Ti(O$_n$-C$_4$H$_9$)Cl$_3$ --, therefor In Column 6, Line 20, delete "Ti(On-C$_4$H$_9$)Cl$_3$" and insert -- Ti(O$_n$-C$_4$H$_9$)Cl$_3$ --, therefor In Column 6, Line 22, delete "Ti(On-C$_4$H$_9$)Cl$_3$" and insert -- Ti(O$_n$-C$_4$H$_9$)Cl$_3$ --, therefor In Column 6, Line 25, delete "Ti(On-C$_4$H$_9$)Cl$_3$" and insert -- Ti(O$_n$-C$_4$H$_9$)Cl$_3$ --, therefor Signed and Sealed this
Twenty-first Day of January, 2025

Coke Morgan Stewart
*Acting Director of the United States Patent and Trademark Office*